(12) United States Patent
Jeong et al.

(10) Patent No.: US 8,748,863 B2
(45) Date of Patent: Jun. 10, 2014

(54) LIGHT EMITTING DEVICE

(75) Inventors: Jongpil Jeong, Seoul (KR); Sanghyun Lee, Seoul (KR); Seonho Lee, Seoul (KR); Hosang Yoon, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 71 days.

(21) Appl. No.: 13/296,584

(22) Filed: Nov. 15, 2011

(65) Prior Publication Data

US 2012/0119186 A1    May 17, 2012

Related U.S. Application Data

(63) Continuation of application No. 12/985,213, filed on Jan. 5, 2011, now Pat. No. 8,033,676.

(30) Foreign Application Priority Data

Nov. 16, 2010 (KR) .......................... 10-2010-0114036

(51) Int. Cl.
  *H01L 29/06* (2006.01)
(52) U.S. Cl.
  USPC ............................................. 257/13; 257/15
(58) Field of Classification Search
  USPC ..................................................... 257/13, 15
  See application file for complete search history.

(56) References Cited

U.S. PATENT DOCUMENTS

| 6,153,894 A | 11/2000 | Udagawa |
| 6,849,881 B1 | 2/2005 | Harle et al. |
| 2009/0029493 A1* | 1/2009 | Emerson et al. ................ 438/22 |

FOREIGN PATENT DOCUMENTS

| WO | WO 02/097904 | 12/2002 |
| WO | WO 02/103814 | 12/2002 |

OTHER PUBLICATIONS

European Search Report dated Mar. 29, 2012 for Application 11189007.5.

* cited by examiner

*Primary Examiner* — Douglas Menz
(74) *Attorney, Agent, or Firm* — KED & Associates LLP

(57) ABSTRACT

A light emitting device may include a light emitting structure that includes a first semiconductor layer, a second semiconductor layer and an active layer between the first semiconductor layer and the second semiconductor layer, wherein the active layer includes a light emitting layer adjacent to the second semiconductor layer and that includes a well layer and a barrier layer and a super-lattice layer between the light emitting layer and the first semiconductor layer, the super-lattice layer including at least six pairs of a first layer and a second layer, wherein a composition of the first layer includes indium (In) and the second layer includes indium (In), and the composition of the first layer is different from the composition of the second layer.

19 Claims, 7 Drawing Sheets

LIGHT EMITTING DEVICE

CROSS-REFERENCE TO RELATED APPLICATION

This application claims priority benefit from Korean Patent Application No. 10-2010-0114036, filed Nov. 16, 2010, the subject matter of which is hereby incorporated by reference.

BACKGROUND

1. Field

Embodiments may relate to a light emitting device.

2. Background

A light emitting device may include, for example, a light emitting diode (LED) including a semiconductor device that converts electrical energy into light.

The light emitting diode is a device that converts electricity into infrared light, visible light, etc., using characteristics of compound semiconductors.

Light emitting diodes may be applied to devices such as home appliances, remote controls, electronic signboards, displays, a variety of automatic appliances and/or the like.

A miniaturized light emitting diode may be fabricated as a surface mount device such that the light emitting diode may be directly provided on a printed circuit board (PCB). Accordingly, an LED lamp used as a display device may be developed as a surface mount device-type. Such a surface mount device may substitute for a lamp and may be used as a lighting display, a character display, an image display and/or the like, for rendering various colors.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
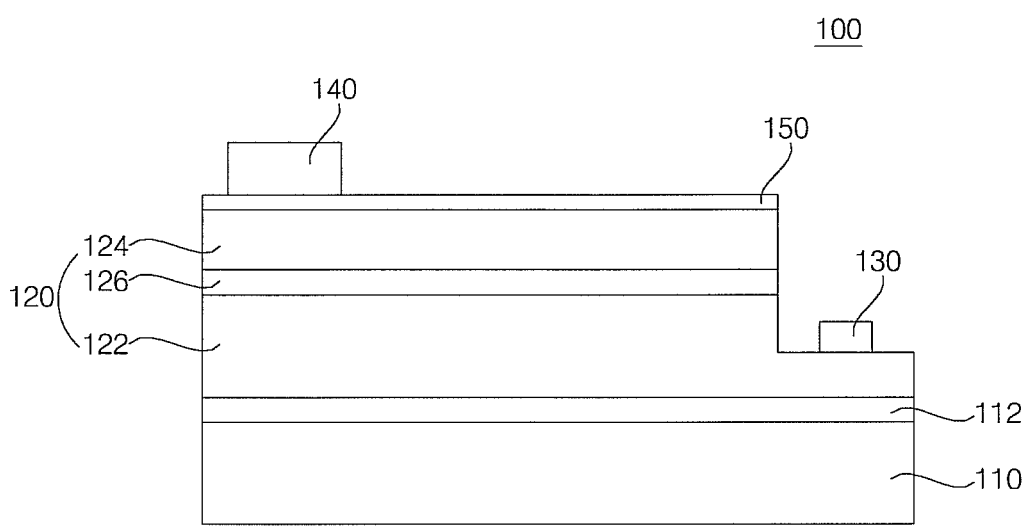
FIG. 1 is a cross-sectional view of a light emitting device in accordance with an embodiment.

Reference may now be made in detail to exemplary embodiments, examples of which may be illustrated in the accompanying drawings. The same reference numbers may be used throughout the drawings to refer to the same or like parts.

It may be understood that when an device such as a layer (film), a region, a pad and/or a pattern is referred to as being "on" or "under" another device, it may be directly or indirectly on or under the other device. Further, the "on" or "under" positioning of each layer may be described based on illustration in the drawings.

In the drawings, thicknesses or sizes of respective layers may be exaggerated, omitted, and/or schematically illustrated for ease of convenience and clarity. Therefore, sizes of respective devices shown in the drawings do not necessarily denote actual sizes thereof.

Angles and directions referred to during description of a structure of a light emitting device array may be described with reference to the drawings. In a description of the structure of the light emitting device array, if reference points with respect to the angles and positional relations are not clearly stated, related drawings may be relied upon.

FIG. 1 is a cross-sectional view of a light emitting device in accordance with an embodiment. Other embodiments and configurations may also be provided.

FIG. 1 shows a light emitting device 100 that may include a substrate 110 and a light emitting structure 120 disposed on the substrate 110. The light emitting structure 120 may have a first semiconductor layer 122, a second semiconductor layer 124 and an active layer 126 between the first semiconductor layer 122 and the second semiconductor layer 124.

The light emitting device 100 may include a light emitting diode (LED) using a compound semiconductor layer composed of Group III to V elements. The LED may be a color LED to emit blue, green or red light, or may be an ultraviolet (UV) LED. The emitted light of the LED may be embodied using various semiconductors within technical ranges as described.

The substrate 110 may be formed using translucent materials including sapphire (Al2O3), for example. Other than sapphire, the substrate 110 may include zinc oxide (ZnO), gallium nitride (GaN), silicon carbide (SiC), aluminum nitride (AlN), and/or so forth.

A refractive index of the substrate 110 may be less than a refractive index of the first semiconductor layer 122, which may improve light extraction efficiency.

The substrate 110 may have a patterned substrate (PSS) structure to increase light extraction efficiency. The substrate 110 may or may not have a PSS structure.

The substrate 110 may have a buffer layer 112 in order to reduce a lattice mismatch between the substrate 110 and the light emitting structure 120, and to facilitate growth of the semiconductor layer.

The buffer layer 112 may be formed under a low temperature atmosphere. The buffer layer 112 may be formed using specific materials that can reduce a difference in lattice constant between the substrate 110 and the light emitting structure 120. These specific materials may include at least one selected from GaN, InN, AlN, AlInN, InGaN, AlGaN, InAlGaN, etc., without being particularly limited thereto.

The buffer layer 112 may be grown into single crystals on the substrate 110. The single crystal-grown buffer layer 112 may enhance crystallinity of the light emitting structure 120 that is grown on the buffer layer 112.

The light emitting structure 120 may include a first semiconductor layer 122, a second semiconductor layer 124, and an active layer 126 between the first semiconductor layer 122 and the second semiconductor layer 124.

The first semiconductor layer 122 may be an N type semiconductor layer, wherein the N type semiconductor layer may be formed using any one selected from semiconductor materials represented by the formula of $In_xAl_yGa_{1-x-y}N$ ($0 \le x \le 1$, $0 \le y \le 1$, $0 \le x+y \le 1$), for example, a group consisting of GaN, AlN, AlGaN, InGaN, InN, InAlGaN, AlInN, etc., and n-type dopants such as Si, Ge, Sn, etc. may be doped thereon.

The first semiconductor layer 122 may supply electrons to the active layer 126, and the first semiconductor layer 122 may be an n-doped semiconductor layer having conductivity formed by doping n-type dopants, or the first semiconductor layer 122 may include an undoped semiconductor layer without n-type dopant doping under the doped semiconductor layer, and without being particularly limited thereto.

In this example, the undoped semiconductor layer may improve crystallinity of the first semiconductor layer 122 and may be substantially identical to the first semiconductor layer 122, other than the undoped semiconductor layer has a lower electrical conductivity than the first semiconductor layer 122, since it is not doped with an n-type dopant.

The first semiconductor layer 122 may have the active layer 126 and the second semiconductor 124, which may be grown in a sequential order.

The active layer 126 may be formed in a single or multi-quantum well structure, a quantum-wire structure or a quantum dot structure and/or the like, using compound semiconductor materials based on elements of Groups III to V.

The active layer 126 may include a region in which electrons are re-combined with holes, and a transition to lower energy levels may occur owing to recombination of such electrons and holes, in turn emitting light at corresponding wavelengths.

The active layer 126 may be formed using a semiconductor material represented by the formula of $In_xAl_yGa_{1-x-y}N$ ($0 \leq x \leq 1$, $0 \leq y \leq 1$, $0 \leq x+y \leq 1$), for example, and the active layer 126 may have a single quantum well structure or a multi-quantum well (MQW) structure.

In the example where the active layer 126 has a quantum well structure, the active layer 126 may have a single or multi-quantum well structure that includes a well layer having the formula of $In_xAl_yGa_{1-x-y}N$ ($0 \leq x \leq 1$, $0 \leq y \leq 1$, $0 \leq x+y \leq 1$) and a barrier layer having the formula of $In_aAl_bGa_{1-a-b}N$ ($0 \leq a \leq 1$, $0 \leq b \leq 1$, $0 \leq a+b \leq 1$). The well layer may be formed of a material having a smaller band gap than the barrier layer.

Embodiments may describe the active layer 126 formed of InGaN containing In, without being particularly limited thereto.

The active layer 126 may include a light emitting layer 126_1 formed in a quantum well structure that includes an InGaN barrier layer and an InGaN well layer, as well as a super-lattice layer 126_2 (SL) which is arranged on bottom of the light emitting layer 126_1 and has a super-lattice structure formed by laminating at least 6 groups (or pairs) of first and second InGaN layers having different In concentrations.

The InGaN barrier layer and InGaN well layer may be represented by the formulae of $In_xGa_{(1-x)}N$ and $In_yGa_{(1-y)}N$ ($0<x<1$, $0<y<1$, $x<y$), respectively. Similarly, the first InGaN and second InGaN may be expressed by the formulae of $In_aGa_{(1-a)}N$ and $In_bGa_{(1-b)}N$ ($0<a<1$, $0<b<1$, $a<b$), respectively.

At least six (6) groups (or pairs) of first InGaN layer and the second InGaN layer may be repeatedly laminated to form the super-lattice layer 126_2, a growth surface may be rendered to facilitate growth of a high quality light emitting layer 126_1, and under influence of such lamination upon a working voltage of the light emitting device 100, variables such as an appropriate thickness of the super-lattice layer 126_2 and In content may reduce the working voltage, and in turn increase an optical efficiency.

The super-lattice layer 126_2 may improve internal quantum efficiency by reducing stress in the active layer 126, and may suitably restrain electrons and holes in the light emitting layer 126_1.

A structure of the active layer 126 may be described with reference to FIG. 2.

A second semiconductor layer 124 may introduce a carrier into the active layer 126 and may be embodied as a p-type semiconductor layer. The p-type semiconductor layer may include any one selected from semiconductor materials having the formula of $In_xAl_yGa_{1-x-y}N$ ($0 \leq x \leq 1$, $0 \leq y \leq 1$, $0 \leq x+y \leq 1$) such as GaN, AlN, AlGaN, InGaN, InN, InAlGaN and AlInN, and may be doped with a p-type dopant such as Mg, Zn, Ca, Sr or Ba.

The first semiconductor layer 122, the active layer 126 and the second semiconductor layer 124 may be fabricated by methods, such as metal organic chemical vapor deposition (MOCVD), chemical vapor deposition (CVD), plasma-enhanced chemical vapor deposition (PECVD), molecular beam epitaxy (MBE), hydride vapor phase epitaxy (HVPE), and/or so forth, for example. However, embodiments are not limited thereto.

A third semiconductor layer having a polarity opposite to the second semiconductor layer 124 may be provided above the second semiconductor layer 124. For example, if the second semiconductor layer 124 is a p-type semiconductor layer, the third semiconductor layer may be an n-type semiconductor layer.

The second semiconductor layer 124 may be a p-type semiconductor layer while the first semiconductor layer 122 is an n-type semiconductor layer. Accordingly, the light emitting device 100 may include at least one of N-P, P-N, N-P-N and P-N-P junction structures, without being limited thereto.

A doping concentration of a conductive dopant in the first semiconductor layer 122 and the second semiconductor layer 124 may be uniform or non-uniform. That is, a structure of plural semiconductor layers may vary, without being limited thereto.

The position of the first semiconductor layer 122 and the second semiconductor layer 124 may be reversed around the active layer 126. The first semiconductor layer 122 that includes an n-type semiconductor layer and is laminated on the substrate 110 may be described below.

At least one region of the active layer 126, the second semiconductor layer 124 and the first semiconductor layer 122 may be removed, the first semiconductor layer 122 may be partially exposed by mesa-etching, and/or a first electrode 130 may be provided on a top of the exposed first semiconductor layer 122.

A light transmitting electrode layer 150 may be provided on the second semiconductor layer 124, and a second electrode 140 may be provided on an outer side of the light transmitting electrode layer 150.

Each of the first electrode 130 and the second electrode 140 may be formed to have a single layer or a multi-layer structure using conductive materials such as metals or alloys selected from In, Co, Si, Ge, Au, Pd, Pt, Ru, Re, Mg, Zn, Hf, Ta, Rh, Ir, W, Ti, Ag, Cr, Mo, Nb, Al, Ni, Cu and WTi, for example.

The light transmitting electrode layer 150 may include at least one of ITO, IZO(In—ZnO), GZO(Ga—ZnO), AZO (Al—ZnO), AGZO(Al—Ga ZnO), IGZO(In—Ga ZnO), IrOx, RuOx, RuOx/ITO, Ni/IrOx/Au and/or Ni/IrOx/Au/ITO. The light transmitting electrode layer 150 may transmit light from the active layer 126 to outside of the light emitting device 100. The light transmitting electrode layer 150 may be formed on an outer side of the second semiconductor layer 124 such that the light transmitting electrode layer 150 has a step with the second semiconductor layer 124. Otherwise, the light transmitting electrode layer 150 may be formed in an entire region of the outer side thereof, thus preventing current crowding.

Although embodiments may describe a horizontal type light emitting device, such embodiments may also be applied to a vertical type light emitting device or other types of light emitting devices, without limitation thereof.

Figure 2:
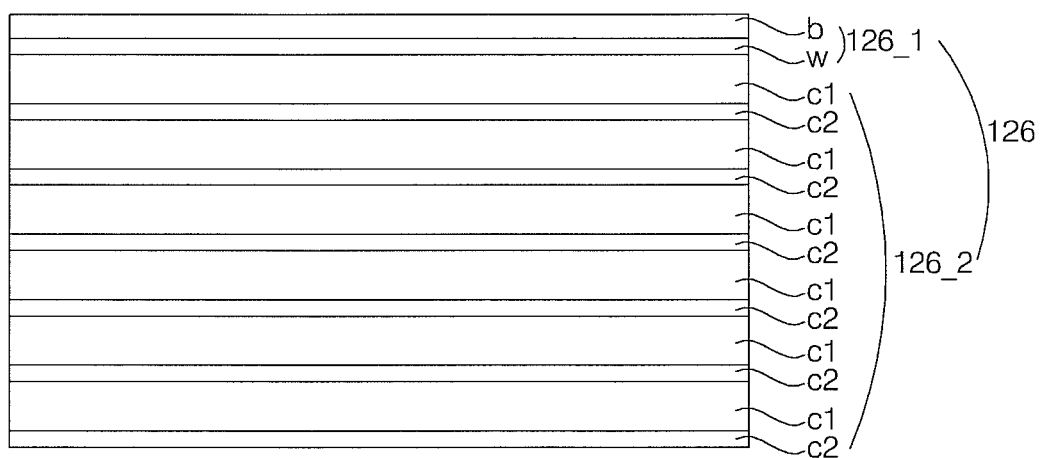
FIGS. 2 and 3 illustrate structures of an active layer of the light emitting device shown in FIG. 1.
Figure 3:
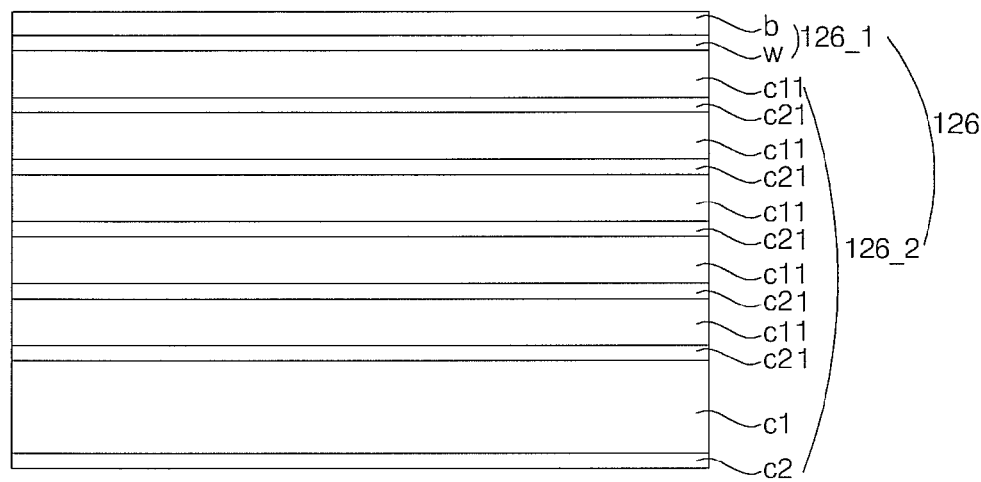

FIGS. 2 and 3 illustrate structures of an active layer of a light emitting device (shown in FIG. 1). Other embodiments and configurations may also be provided.

As shown in FIG. 2, the active layer 126 may include the light emitting layer 126_1 and the super-lattice layer 126_2.

The light emitting layer 126_1 may have a quantum well structure including an InGaN barrier layer 'b' and an InGaN well layer 'w.' The InGaN barrier layer 'b' and the InGaN well layer 'w' may be formed into one to five groups (pairs).

Each of the InGaN barrier layer 'b' and the InGaN well layer 'w' may have an In content of 3% to 18%. That is, the In content of the InGaN well layer 'w' is 4 to 7 times greater than the In content of the InGaN barrier layer 'b,' where the InGaN barrier layer 'b' is represented by the formula of $In_{0.03}Ga_{0.97}N$ and the InGaN well layer 'w' is represented by the formula of $In_{0.18}Ga_{0.82}N$.

In this regard, a thickness of the InGaN barrier layer 'b' may be 1.7 to 2.0 times greater than a thickness of the InGaN well layer 'w', and the thickness may vary based on the In content.

Figure 10:
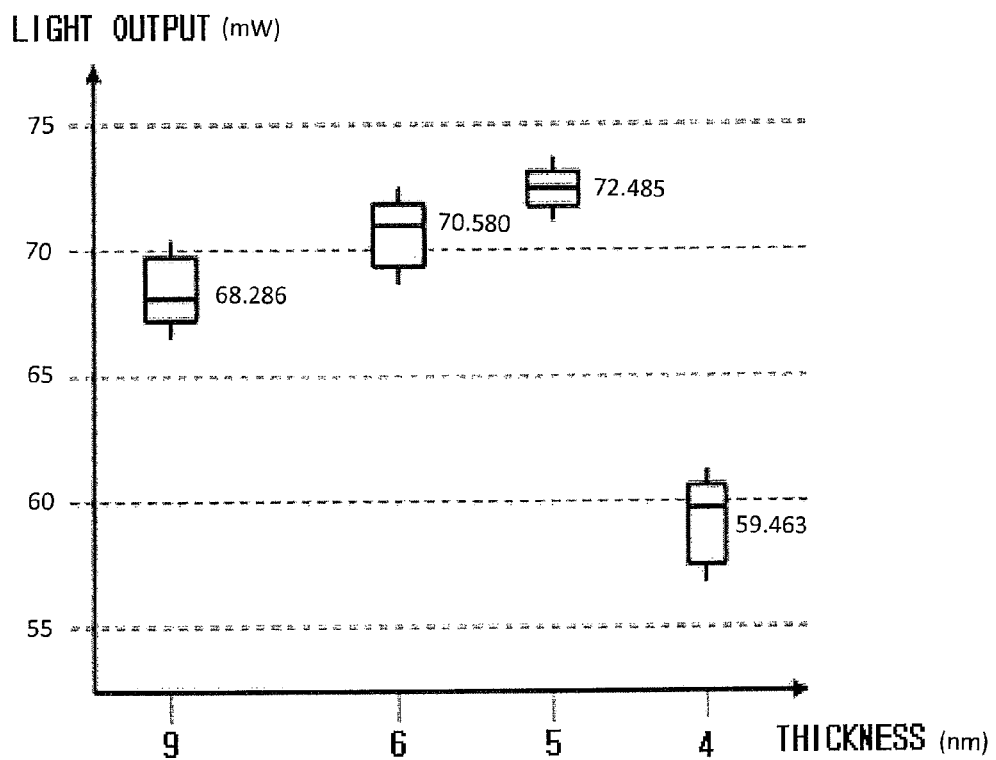
FIG. 10 is a graph.

In other words, referring to GRAPH 1 shown in FIG. 10, when a thickness of the InGaN well layer 'w' is maintained at 3 nm while a thickness of the InGaN barrier layer 'b' changes to 4 nm, 5 nm, 6 nm and 9 nm, respectively, and a rated current of 800 mA is applied, a light output PO graph and data thereof may be expressed as follows:

For example, when a thickness of the InGaN well layer 'w' is 3 nm, it may be seen from GRAPH 1 shown in FIG. 10 that the InGaN barrier layer 'b' having a thickness of 4 nm may exhibit a PO of 59.463, the InGaN barrier layer 'b' having a thickness of 5 nm may exhibit a PO of 72.485, and the InGaN barrier layers 'b' having thicknesses of 6 nm and 9 nm may exhibit POs of 70.580 and 68.286, respectively.

GRAPH 1 shown in FIG. 10 also shows that if the thickness of the InGaN barrier layer 'b' is 1.7 to 2 times greater than the thickness of the InGaN well layer 'w,' a range of variation in PO may be relatively reduced. It may also be seen that, when the thickness of the InGaN barrier layer 'b' is outside the foregoing range (i.e., less than 1.6 times or more than 2.0 times that of the InGaN well layer 'w'), then the PO is decreased.

The super-lattice layer 126_2 may have a super-lattice structure formed by laminating at least six (6) groups (or pairs) of first InGaN 'c1' and second InGaN 'c2', and a thickness of the super-lattice layer 126_2 may be 8 to 10 times greater than a thickness of the light emitting layer 126_1, or 12 to 14 times greater than a thickness of the InGaN barrier layer 'b.'

FIG. 2 illustrates 6 groups (or pairs) of the first InGaN c1 and the second InGaN c2, which have a same formulae (or composition), respectively.

The In content of the second InGaN c2 may be 3 to 5 times greater than the In content of the first InGaN c1, and the first InGaN c1 and the second InGaN c2 may be represented by the formulae $In_{0.02}Ga_{0.98}N$ and $In_{0.09}Ga_{0.91}N$, respectively.

As such, when repeatedly laminating groups (or pairs) of the first InGaN c1 and the second InGaN c2 represented by the formulae of $In_{0.02}Ga_{0.98}N$ and $In_{0.09}Ga_{0.91}N$, respectively, a large amount of electrons may move and may be collected at a low energy level of the light emitting layer 126_1, which may in turn increase recombination probability of electrons and holes and thus improve light emitting efficiency.

The super-lattice layer 126_2 may effectively relieve stress caused by a lattice mismatch between the light emitting layer 126_1 and the first semiconductor layer 122.

In this example, a thickness of the first InGaN c1 may be 4 to 5 times greater than a thickness of the second InGaN c2, or may be 2 to 4 times greater than a thickness of at least one of the InGaN well layer 'a' and/or the InGaN barrier layer 'b', and the thickness may be controlled based on the In content.

As the In content decreases, an energy gap increases. On the contrary, the energy gap may be reduced with an increase in In content.

In describing FIG. 3, a same portion as in FIG. 2 may be omitted or may be briefly described.

With reference to FIG. 3, a detailed description of the light emitting layer 126_1 may be omitted since it is substantially the same as described with respect to FIG. 2.

The super-lattice layer 126_2 may have a super-lattice structure formed of at least 6 groups (or pairs) including a first InGaN 'c1', at least one InGaN 'c11' having a formula (or composition) different from that of the first InGaN c1, a second InGaN 'c2,' and at least one InGaN 'c21' having a formula (or composition) different from that of the second InGaN c2. A detailed description thereof may be omitted since it is substantially the same as described in relation to FIG. 2.

As shown in FIG. 3, the first InGaN c1 and the second InGaN c2 are located on a lowermost of the super-lattice layer 126_2 and the foregoing InGaN c11 and the InGaN c21 may be laminated on the first InGaN c1 and the second InGaN c2.

The thicknesses of the first InGaN c1 and the second InGaN c2 may be different from the thicknesses of the InGaN c11 and the InGaN c21.

For example, a lowermost group (or pair) of the first InGaN c1 and the second InGaN c2 may be provided at the bottom of the super-lattice layer 126_2 and five (5) groups (or pairs) of InGaN c11 and InGaN c21 may be repeatedly laminated on the lowermost group (or pair), as described above.

In this example, thicknesses of the first InGaN c1 and the second InGaN c2 may be different from thicknesses of the other five groups (or pairs) of InGaN c11 and InGaN c21.

That is, a thickness of each of the first InGaN c1 and the second InGaN c2 placed on the first semiconductor layer 122 may be 1.5 to 2 times greater than of each of the five groups (or pairs) of InGaN c11 and InGaN c21. This may increase stress between the first semiconductor layer 122 and upper groups (or pairs) of InGaN c11 and InGaN c21 through the first InGaN c1 and the second InGaN c2.

The lowermost layer composed of the first InGaN c1 provided on the first semiconductor layer 122 may enhance strain of other InGaN c11 and InGaN c21 as well as growth uniformity thereof by decreasing a Si doping level and increasing a thickness thereof than that of InGaN c11.

The first InGaN c1 and the second InGaN c2 may contain Al, without being particularly limited thereto.

Figure 4:
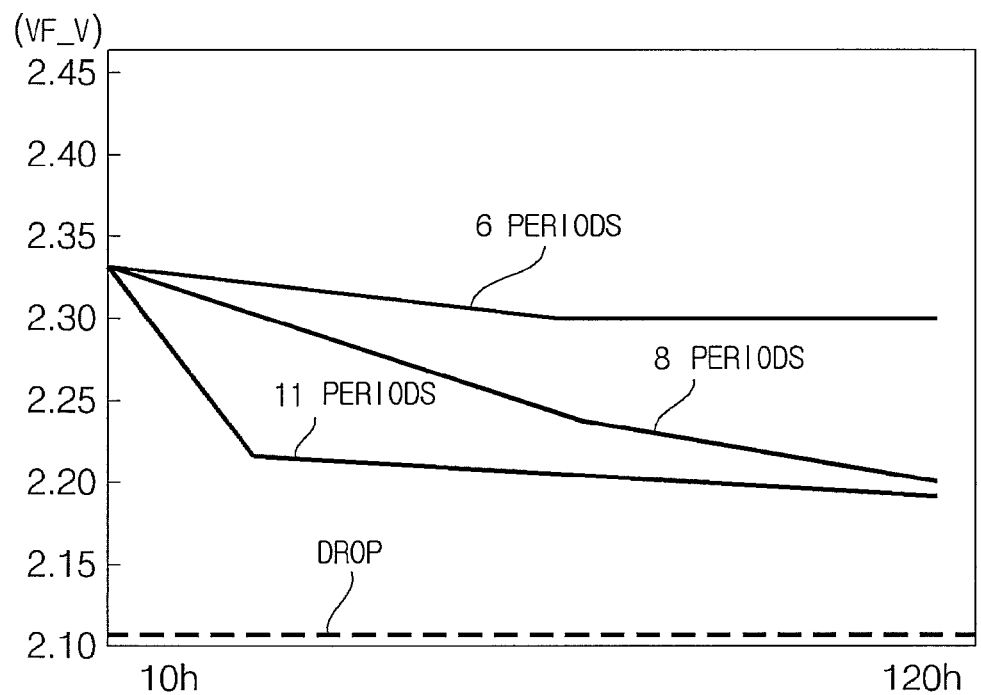
FIG. 4 is a graph showing reliability test results of the light emitting device.

FIG. 4 is an experimental graph showing reliability test results of the light emitting device.

FIG. 4 illustrates graphs of severity test results regarding reliability of the first InGaN c1 and the second InGaN c2 which are formed in 6 groups (or pairs), 8 groups (or pairs) and 11 groups (or pairs), respectively, to form each of the super-lattice layers 126_2 in the active layer 126 shown in FIGS. 2 and 3, respectively.

In this regard, the foregoing 6, 8 and 11 groups (or pairs) respectively refer to overall groups (or pairs) including one group (or pair) of a second InGaN c2 and a first InGaN c1 laminated thereon, as well as a plurality of groups (or pairs) of first InGaN c1 and the second InGaN c2 alternately laminated thereon.

In FIG. 4, a left side may be rated voltage VF_V and a right side may be a test period of time (h) and each of the graphs may be obtained when a rated current of 2 μA is applied thereto.

More particularly, with regard to the light emitting device, if a super-lattice layer 126_2 includes each of 6, 8 or 11 groups (or pairs) of the first InGaN c1 and the second InGaN c2, a drop rate at ageing is near 0%. However, a 6 group (or pair) based light emitting device may exhibit a decreased variation in a rated voltage VF_V, compared to light emitting devices including 8 and 11 groups (or pairs).

FIG. 4 also demonstrates an average for seven (7) samples, each having a super-lattice layer 126_6 including 6, 8 or 11 groups (or pairs), as described above. Depending upon individual periods, respective values may be slightly different from the illustrated graph; however, is not particularly limited thereto.

From FIG. 4, it may be seen that the super-lattice layer 126_2 formed by repeatedly laminating 6 groups (or pairs) of first InGaN c1 and second InGaN c2 is more beneficial than similar ones having 8 and 11 groups (or pairs), respectively, in consideration of production process and cost.

Figure 5:
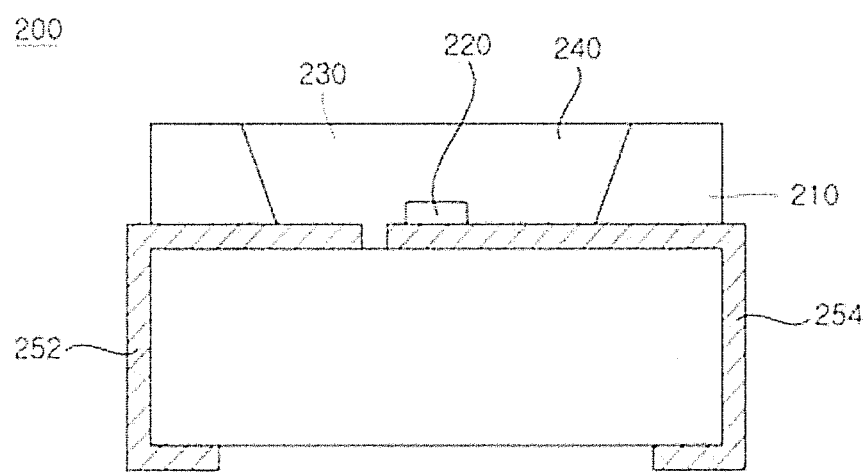
FIG. 5 is a cross-sectional view of a light emitting device package in accordance with an embodiment.

FIG. 5 is a cross-sectional view of a light emitting device package in accordance with an embodiment. Other embodiments and configurations may also be provided.

FIG. 5 shows that a light emitting device package 200 includes a body 210 having a cavity, a light emitting device 220 mounted at a bottom of the body 210, and a resin (or a resin layer) 230 that fills the cavity. The resin layer 230 may include a phosphor 240.

The body 210 may be formed using at least one selected from resin materials such as polyphthalamide (PPA), silicon (Si), aluminum nitride (AlN), liquid crystal polymer (photo sensitive glass, PSG), polyamide 9T (PA9T), syndiotactic polystyrene (SPS), metal materials, sapphire (Al2O3), beryllium oxide (BeO), printed circuit boards (PCB), and/or etc. The body 210 may be formed by a process such as injection molding, etching, etc., without being particularly limited thereto.

An inner surface of the body 210 may have an inclined surface. A reflective angle of light emitted from the light-emitting device 220 may vary, depending on the angle of the inclined surface. Accordingly, an orientation angle of light emitted to the outside may be controlled.

As seen from the top, the cavity in the body 210 may have various shapes including, but not limited to, a circular shape, a rectangular shape, a polygonal shape, an oval shape and/or a shape with curved corners.

The light emitting device 220 may be mounted on the bottom of the body 210, and the light emitting device 220 may correspond to the light emitting device 100 of FIG. 1. The light emitting device 220 may include, but may not be limited thereto, color light emitting devices to emit red, green, blue and/or white light, and UV light emitting devices to emit ultraviolet light. At least one light emitting device may be mounted on the body 210.

The body 210 may include a first lead frame 252 and a second lead frame 254. The first and second lead frames 252 and 254 may be electrically connected to the light emitting device 220 to supply power thereto.

The first and second lead frames 252 and 254 may be electrically isolated from each other, may reflect light emitted by the light emitting device 220 so as to increase light efficiency, and may discharge heat generated by the light emitting device 220.

The first and second lead frames 252 and 254 may include a metal material selected from titanium (Ti), copper (Cu), nickel (Ni), gold (Au), chrome (Cr), tantalum (Ta), platinum (Pt), tin (Sn), silver (Ag), phosphorus (P), aluminum (Al), indium (In), palladium (Pd), cobalt (Co), silicon (Si), germanium (Ge), hafnium (Hf), ruthenium (Ru), iron (Fe), and/or alloys thereof, for example. The first and second lead frames 252 and 254 may have a monolayer structure or a multilayer structure, without being limited thereto.

The resin 230 may fill the cavity, and may include at least one of the phosphor 240 and/or a light diffusing material.

The resin 230 may include a transparent silicon, epoxy and/or any other resin material, and the resin 230 may fill (or partly fill) a cavity with such material, followed by UV or heat curing the same.

The phosphor 240 may be selected based on the wavelength of light emitted from the light emitting device 220, to allow the light emitting device package 200 to render white light.

The phosphor 240 contained in the resin 230 may be any one selected from a blue light emitting phosphor, a blue-green light emitting phosphor, a green light emitting phosphor, a yellow-green light emitting phosphor, a yellow light emitting phosphor, a yellow-red light emitting phosphor, an orange light emitting phosphor and/or a red light emitting phosphor, based on the wavelength of light emitted from the light emitting device 220.

The phosphor 240 may be excited by first light emitted from the light emitting device 220 to create second light. For example, in the example where the light emitting device 220 is a blue light emitting diode (LED) and the phosphor 240 is a yellow phosphor, the yellow phosphor may be excited by blue light to emit yellow light, and blue light emitted from the blue LED and yellow light excited from the blue light may be combined, and the light emitting device package 200 may emit white light.

If the light emitting device 220 is a green LED, a magenta phosphor as well as blue and red phosphors 240 may be employed together. Alternatively, when the light emitting device 220 is a red LED, a cyan phosphor as well as blue and green phosphors may be employed together.

The phosphor 240 may be any one commonly known such as YAG, TAG, sulfide, silicate, aluminate, nitride, carbide, nitride-silicate, borate, fluoride and/or phosphate based material, etc.

Figure 6:
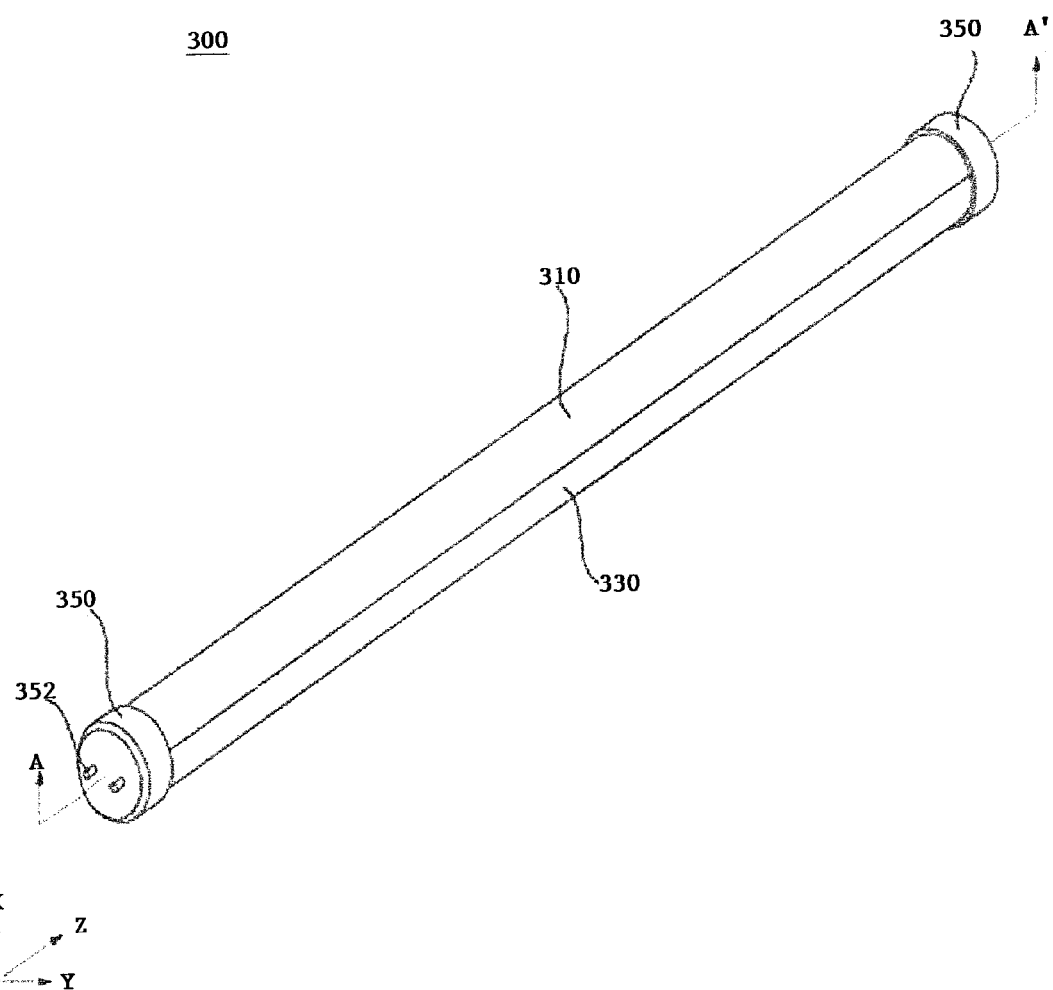
FIG. 6 shows an illumination device that includes a light emitting device in accordance with an embodiment.
Figure 7:
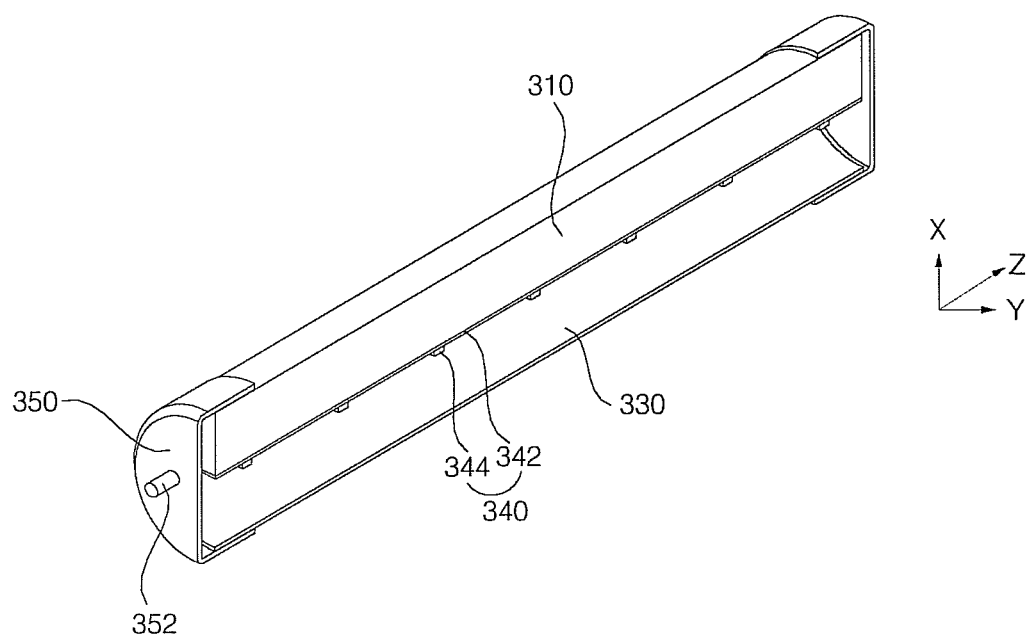
FIG. 7 is a cross-sectional view taken along line A-A' of FIG. 6.

FIG. 6 shows an illumination device that includes a light emitting device in accordance with an embodiment. FIG. 7 is a cross-sectional view taken along line A-A' of FIG. 6. Other embodiments and configurations may also be provided.

FIG. 6 shows a lighting instrument 300. A description may be provided in terms of a length direction Z, a horizontal direction Y perpendicular to the length direction Z, and a height direction X perpendicular to both the length direction Z and the horizontal direction Y.

FIG. 7 is a cross-sectional view when viewing in the horizontal direction Y after cutting the lighting instrument 300 along a plane formed of the length direction Z and the height direction X.

The lighting instrument 300 may include a body 310, a cover 330 coupled with the body 310, and end caps 350 provided to both ends of the body 310.

The body 310 may be connected with a light emitting device module 340 at a bottom side thereof. In order to discharge heat generated from the light emitting device module 340 to the outside through a top of the body 310, the body 310 may be made of metal materials having excellent thermal conductivity and heat dissipation effects.

The light emitting device module 340 may include a light emitting device package 344 having a PCB 342 and a light emitting device. The package 344 may be mounted on the PCB 342 with multiple colors and in multiple rows to form an array, and may be spaced from one another by a predetermined interval or if necessary, by different distances, to control brightness. The PCB 342 may be a metal core PCB (MPPCB) or a PCB made of FR4.

The cover 330 may be circular in shape to surround a bottom of the body 310, without being limited thereto.

The cover 330 may protect the light emitting device module 340 from foreign substances. The cover 330 may prevent glare occurred by the light emitting device package 344 and may include diffusion particles to uniformly discharge light to the outside. A prism pattern or the like may be formed on at least one of the inner and outer surfaces of the cover 330. Alternatively, a phosphor may be applied to at least one of the inner and outer surfaces of the cover 330.

The cover 330 may exhibit superior light transmittance to discharge light emitted by the light emitting device package 344 through the cover 330 to the outside. The cover 330 may exhibit sufficient heat resistance to endure heat generated by the light emitting device package 344. The cover 330 may be composed of a material including polyethylene terephthalate (PET), polycarbonate (PC) or polymethyl methacrylate (PMMA) and/or the like.

The end cap 350 may be arranged on both ends of the body 310, and may be used to seal a power device. Additionally, the end cap 350 may be provided with a power pin 352 to allow the lighting instrument 300 to be applied to a terminal from which a fluorescent light has been removed, without using any additional device.

Figure 8:
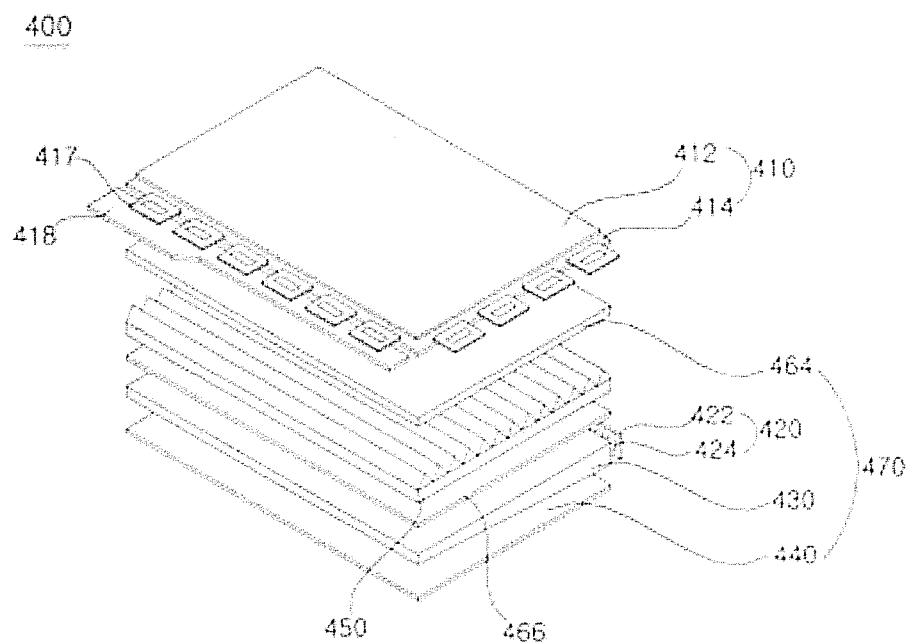
FIG. 8 shows a liquid crystal display device that includes a light emitting device in accordance with an embodiment.

FIG. 8 shows a liquid crystal display device that includes a light emitting device in accordance with an embodiment. Other embodiments and configurations may also be provided.

FIG. 8 illustrates an edge-light type liquid crystal display device 400 that includes a liquid crystal display panel 410 and a backlight unit 470 to supply light to the liquid crystal display panel 410.

The liquid crystal display panel 410 may display an image using light supplied from the backlight unit 470. The liquid crystal display panel 410 may include a color filter substrate 412 and a thin film transistor substrate 414 that face each other with a liquid crystal interposed therebetween.

The color filter substrate 412 may render color images to be displayed through the liquid crystal display panel 410.

The thin film transistor substrate 414 may be electrically connected to a printed circuit board 418 on which a plurality of circuit components are mounted through a driving film 417. The thin film transistor substrate 414 may respond to drive signals supplied from the printed circuit board 418, and may apply a drive voltage from the printed circuit board 418 to liquid crystals.

The thin film transistor substrate 414 may include a thin film transistor and a pixel electrode formed as a thin film on other substrates composed of a transparent material such as glass or plastic.

The backlight unit 470 may include a light emitting device module 420 to emit light, a light guide plate 430 to convert light emitted by the light emitting device module 420 into surface light and supply the light to the liquid crystal display panel 410, a plurality of films 450, 466 and 464 to uniformize a brightness distribution of light emitted by the light guide plate 430 and improve vertical incidence, and a reflective sheet 440 to reflect light emitted to the back of the light guide plate 430.

The light emitting device module 420 may include a plurality of light emitting device packages 424 and a PCB 422 on which the light emitting device packages 424 are mounted to form an array.

The light emitting device in the light emitting device package 424 may correspond to the light emitting device shown FIG. 1.

The backlight unit 470 may include a diffusion film 466 to diffuse light projected from the light guide plate 430 toward the liquid crystal display panel 410, a prism film 450 to concentrate the diffused light and thus improve a vertical incidence, and a protective film 464 to protect the prism film 450.

Figure 9:
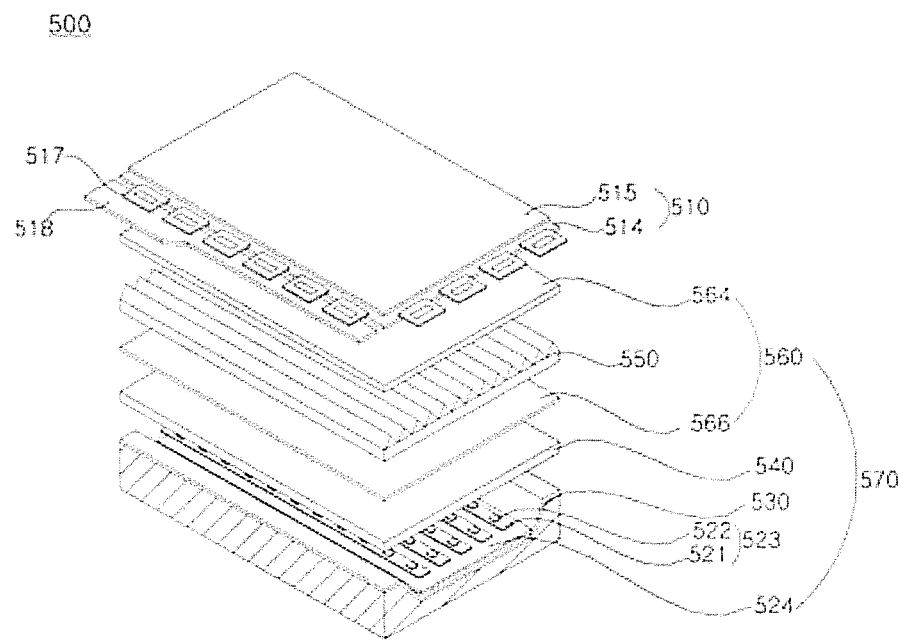
FIG. 9 is a perspective view of a liquid crystal display device that includes a light emitting device in accordance with an embodiment.

FIG. 9 shows a liquid crystal display device that includes a light emitting device. Other embodiments and configurations may also be provided.

FIG. 9 illustrates a direct-type liquid crystal display device 500 that includes a liquid crystal display panel 510 and a backlight unit 570 to supply light to the liquid crystal display panel 510.

The liquid crystal display panel 510 may be substantially the same as described in FIG. 8, and a further explanation may be omitted.

The backlight unit 570 may include a plurality of light emitting device modules 523, a reflective sheet 524, a lower chassis 530 in which the light-emitting device modules 523 and the reflective sheet 524 are accepted, a diffusion plate 540 arranged on the light-emitting device modules 523, and a plurality of optical films 560.

Each light emitting device module 523 may include a plurality of light-emitting device packages 522 and a PCB 521 on which the light-emitting device packages 522 are mounted to form an array.

The reflective sheet 524 may reflect light emitted from the light emitting device package 522 toward the liquid crystal display panel 510, so as to improve a luminous efficiency.

Light emitted from the light emitting device module 523 may be projected onto the diffusion plate 540 and an optical film 560 may be arranged on the diffusion plate 540. The optical film 560 may include a diffusion film 566, a prism film 550 and a protective film 564.

The lighting instrument 300 and the liquid crystal displays 400 and 500 may be included in a lighting system.

A light emitting device as embodied and broadly described herein may include an active layer having a super-lattice structure, so as to attain improvement in brightness and ESD characteristics while decreasing (covalent) bonds in crystals.

A light emitting device may include an active layer having a super-lattice layer, and crystal defects occurring between a light emitting layer and a buffer layer may be decreased while enhancing brightness and reliability.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A light emitting device, comprising:
a light emitting structure that includes a first semiconductor layer, a second semiconductor layer and an active layer between the first semiconductor layer and the second semiconductor layer,
wherein the active layer includes:
a light emitting layer adjacent to the second semiconductor layer and that includes a well layer and a barrier layer; and
a super-lattice layer between the light emitting layer and the first semiconductor layer, the super-lattice layer including at least six pairs of a first layer and a second layer, wherein a composition of the first layer includes indium (In) and a composition of the second layer includes indium (In), and the composition of the first layer is different from the composition of the second layer,
wherein a thickness of each of the first layer and the second layer in a lowermost pair of the super-lattice layer is different from a thickness of each of the first layer and the second layer in other pairs of the super-lattice layer.

2. The light emitting device of claim 1, wherein a thickness of the super-lattice layer is 8 to 10 times greater than a thickness of the light emitting layer.

3. The light emitting device of claim 1, wherein a thickness of the super-lattice layer is 12 to 14 times greater than a thickness of the barrier layer.

4. The light emitting device of claim 1, wherein In content of the second layer is greater than In content of the first layer.

5. The light emitting device of claim 1, wherein In content of the second layer is 3 to 5 times greater than In content of the first layer.

6. The light emitting device of claim 1, wherein a thickness of the first layer is 4 to 5 times greater than a thickness of the barrier layer.

7. The light emitting device of claim 1, wherein a thickness of the first layer is 2 to 4 times greater than a thickness of at least one of the well layer or the barrier layer.

8. The light emitting device of claim 1, wherein the well layer contains In, and In contents of the first and second layers are less than In content of the well layer.

9. The light emitting device of claim 1, wherein the barrier layer contains In, and In content of the second layer is greater than In content of the well layer.

10. The light emitting device of claim 1, wherein an energy gap of the first layer is larger than an energy gap of the second layer.

11. The light emitting device of claim 1, wherein a thickness of the first layer in a lowermost pair of the first layer and the second layer is 1.5 to 2 times greater than a thickness of the first layer in another pair of the first layer and the second layer.

12. The light emitting device of claim 1, further comprising a third semiconductor layer provided on the second semiconductor layer, wherein the third semiconductor layer has a polarity opposite to the second semiconductor layer.

13. A light emitting device package, comprising:
the light emitting device of claim 1; and
a body that includes a first lead frame and a second lead frame spaced from the first lead frame, and the light emitting device is provided on the first lead frame, and wherein a resin material fills at least one cavity formed on the first lead frame and the second lead frame electrically connected to the light emitting device.

14. A light emitting device, comprising:
a light emitting structure that includes a first semiconductor layer, a second semiconductor layer and an active layer between the first semiconductor layer and the second semiconductor layer,
wherein the active layer includes:
a light emitting layer adjacent to the second semiconductor layer and that includes a well layer and a barrier layer; and
a super-lattice layer between the light emitting layer and the first semiconductor layer, the super-lattice layer including at least six pairs of a first InGaN layer and a second InGaN layer, wherein a composition of the first InGaN layer is different from a composition of the second InGaN layer,
wherein a thickness of each of the first layer and the second layer in a lowermost pair is respectively 1.5 to 2 times greater than a thickness of each of the first layer and the second layer in other pairs.

15. The light emitting device of claim 14, wherein a thickness of the super-lattice layer is 8 to 10 times greater than a thickness of the light emitting layer.

16. The light emitting device of claim 14, wherein a thickness of the super-lattice layer is 12 to 14 times greater than a thickness of the barrier layer.

17. The light emitting device of claim 14, wherein In content of the second InGaN layer is greater than In content of the first InGaN layer.

18. The light emitting device of claim 14, wherein In content of the second InGaN layer is 3 to 5 times greater than In content of the first InGaN layer.

19. The light emitting device of claim 14, wherein a thickness of the first InGaN layer is 4 to 5 times greater than a thickness of the barrier layer.

* * * * *